US007045554B2

(12) United States Patent
Raje et al.

(10) Patent No.: US 7,045,554 B2
(45) Date of Patent: May 16, 2006

(54) METHOD FOR IMPROVED FISCHER-TROPSCH CATALYST STABILITY AND HIGHER STABLE SYNGAS CONVERSION

(75) Inventors: Ajoy P. Raje, Stillwater, OK (US); Rafael Espinoza, Ponca City, OK (US)

(73) Assignee: ConocoPhillips Company, Houston, TX (US)

( * ) Notice: Subject to any disclaimer, the term of this patent is extended or adjusted under 35 U.S.C. 154(b) by 197 days.

(21) Appl. No.: 10/654,087

(22) Filed: Sep. 3, 2003

(65) Prior Publication Data

US 2005/0049317 A1    Mar. 3, 2005

(51) Int. Cl.
C07C 27/00    (2006.01)
(52) U.S. Cl. .................. 518/709; 518/77; 518/715; 518/719
(58) Field of Classification Search ............. 518/709, 518/700, 715, 719
See application file for complete search history.

(56) References Cited

U.S. PATENT DOCUMENTS

| | | | |
|---|---|---|---|
| 2,415,861 A | 8/1947 | Brown et al. ............... 260/666 |
| 2,453,035 A | 12/1948 | Wobker ...................... 196/52 |
| 2,500,519 A | 3/1950 | Clark ....................... 260/449.6 |
| 2,518,775 A | 8/1950 | Guyer ...................... 260/449.6 |
| 2,540,109 A | 2/1951 | Friedman | |
| 2,564,985 A | 8/1951 | Mayland ................... 260/449.6 |
| 2,608,568 A | 8/1952 | Hogan et al. | |
| 2,719,130 A | 9/1955 | Stewart ...................... 252/373 |
| 2,735,802 A | 2/1956 | Jahnig ......................... 196/52 |
| 3,812,035 A | 5/1974 | Krenowicz et al. ............ 252/59 |
| 3,958,957 A | 5/1976 | Koh et al. .................... 48/197 |
| 3,996,105 A | 12/1976 | Harrison et al. .............. 195/28 |
| 4,151,190 A | 4/1979 | Murchison et al. ........... 260/449 |
| 4,171,320 A | 10/1979 | Vannice et al. .............. 260/449 |
| 4,197,418 A | 4/1980 | Lee et al. .................... 585/469 |
| 4,269,940 A | 5/1981 | Patel et al. .................. 435/148 |
| 4,318,784 A | 3/1982 | Higgins et al. ................ 204/73 |
| 4,585,798 A | 4/1986 | Beuther et al. ............... 518/715 |
| 4,587,216 A | 5/1986 | Patel et al. .................. 435/123 |
| 4,595,703 A | 6/1986 | Payne et al. ................. 518/715 |
| 4,600,499 A | 7/1986 | Hettinger, Jr. ............... 208/113 |
| 4,606,811 A | 8/1986 | Hettinger .................... 208/108 |
| 4,622,308 A | 11/1986 | Koikeda et al. ............... 502/66 |
| 4,738,948 A | 4/1988 | Iglesia et al. ................ 502/326 |
| 4,744,883 A | 5/1988 | Hettinge, Jr. ................ 208/108 |
| 4,800,189 A | 1/1989 | Eschwey et al. ............. 502/400 |
| 4,822,824 A | 4/1989 | Iglesia et al. ................ 518/709 |
| 4,827,043 A | 5/1989 | Butler ........................ 568/492 |
| 4,923,841 A | 5/1990 | Hamner et al. ............... 502/230 |
| 4,978,689 A | 12/1990 | Bell et al. ................... 518/709 |
| 5,128,060 A | 7/1992 | Ueno et al. .................. 252/184 |
| 5,192,672 A | 3/1993 | Lipscomb ................... 435/155 |
| 5,260,239 A | 11/1993 | Hsia .......................... 502/30 |
| 5,268,344 A | 12/1993 | Pedrick et al. ............... 502/30 |
| 5,283,216 A | 2/1994 | Mitchell ..................... 502/30 |
| 5,356,845 A | 10/1994 | Clavenna et al. ............ 502/21 |
| 5,389,690 A | 2/1995 | Mitchell ..................... 518/700 |
| 5,397,806 A | 3/1995 | Soled et al. ................. 518/715 |
| 5,446,232 A | 8/1995 | Chen et al. .................. 585/845 |
| 5,453,211 A | 9/1995 | Alward ....................... 252/45 |
| 5,484,580 A | 1/1996 | Sharma ...................... 423/219 |
| 5,545,674 A | 8/1996 | Behrmann et al. ........... 518/715 |
| 5,607,572 A | 3/1997 | Joshi ......................... 205/763 |
| 5,714,379 A | 2/1998 | Phipps, Jr. ................... 435/266 |
| 5,728,918 A | 3/1998 | Nay et al. ................... 585/733 |
| 5,730,003 A | 3/1998 | Nguyen et al. ............... 62/648 |
| 5,811,468 A | 9/1998 | Chang et al. ................ 518/700 |
| 5,817,701 A | 10/1998 | Leviness et al. ............. 518/700 |
| 5,817,702 A | 10/1998 | Behrmann et al. ........... 518/700 |
| 5,821,270 A | 10/1998 | Chang et al. ................ 518/700 |
| 5,844,005 A | 12/1998 | Bauman et al. .............. 518/700 |
| 5,929,126 A | 7/1999 | Koveal et al. ............... 518/708 |
| 5,958,757 A | 9/1999 | Steffan et al. ............. 435/262.5 |
| 5,958,986 A | 9/1999 | Mart et al. .................. 518/709 |
| 5,973,012 A | 10/1999 | Behrmann et al. ........... 518/700 |
| 5,985,649 A | 11/1999 | Stensel et al. ............... 435/266 |
| 6,019,810 A | 2/2000 | Phillips et al. ................ 55/512 |
| 6,022,755 A | 2/2000 | Kinnari et al. ................ 438/53 |
| 6,025,305 A | 2/2000 | Aldrich et al. ............... 508/110 |
| 6,043,288 A | 3/2000 | DeGeorge et al. ........... 518/715 |
| 6,066,679 A | 5/2000 | Leviness et al. ............. 518/709 |
| 6,068,760 A | 5/2000 | Benham et al. .............. 208/950 |
| 6,103,773 A | 8/2000 | Wittenbrink et al. ........ 518/702 |
| 6,107,353 A | 8/2000 | Koveal et al. ............... 518/705 |
| 6,147,126 A | 11/2000 | DeGeorge et al. ........... 518/715 |

(Continued)

FOREIGN PATENT DOCUMENTS

EP    0 533 228 A1    3/1993

(Continued)

OTHER PUBLICATIONS

Van Duk et al., Journal of Catalysis 78, 24-33, the role of carbon and oxygen in the activation of an irón Fischer-Tropsch catalyst at low pressures, (1982).*

Database CAPLUS on STN, Chemical Abstract (Columbus, Ohio, USA), CA:97:219329, Van Duk et al., "*The Role Of Carbon And Oxygen In The Activation Of An Iron Fischer-Tropsch Catalyst At Low Temperature,*" Journal of Catalysis, No. 78, No. 1 (1982), pp. 24-33.

(Continued)

*Primary Examiner*—J. Parsa
(74) *Attorney, Agent, or Firm*—Conley Rose P.C.

(57) ABSTRACT

The present invention is generally related towards methods for preparing and using a more stable synthesis catalysts. In particular, the present invention is directed towards treating synthesis catalysts with low levels of oxygen to deactivate the smaller more unstable metal crystallites present in the catalyst matrix. The process can be carried out either prior to and/or simultaneously with the synthesis reaction.

29 Claims, 4 Drawing Sheets

U.S. PATENT DOCUMENTS

| | | | |
|---|---|---|---|
| 6,169,120 B1 | 1/2001 | Beer | 518/715 |
| 6,254,946 B1 | 7/2001 | Hirata et al. | 428/35.2 |
| 6,262,132 B1 | 7/2001 | Singleton et al. | 518/715 |
| 6,277,338 B1 | 8/2001 | Agee et al. | 422/189 |
| 6,287,653 B1 | 9/2001 | Speer et al. | 428/35.4 |
| 6,351,971 B1 | 3/2002 | Nguyen et al. | 62/648 |
| 6,369,148 B1 | 4/2002 | Chiang et al. | 524/417 |
| 6,376,434 B1 | 4/2002 | Katafuchi | 508/291 |
| 6,475,943 B1 | 11/2002 | Hoek et al. | 502/53 |

FOREIGN PATENT DOCUMENTS

| | | |
|---|---|---|
| EP | 94203562.7 | 12/1994 |
| GB | 2 222 531 | 3/1990 |
| GB | 2 258 826 | 2/1993 |
| WO | WO 97/17137 | 5/1997 |
| WO | WO 02/083817 | 10/2002 |
| WO | WO 03/035257 | 1/2003 |

OTHER PUBLICATIONS

PCT International Search Report for Application No. PCT/US04/19039, Dated Dec. 27, 2004; (3 p.).

PCT International Search Report for Application No. PCT/US00/31559, Dated Mar. 29, 2001; (5 p.).

Article entitled "Study of effect of water on alumina supported cobalt Fischer-Tropsch catalysts," by A.M. Hilmen et al., Elsevier, Applied Catalysts A: General 186, pp. 169-188, 1999.

European International Search Report for European Application No. EP 03 25 5907, dated Feb. 12, 2004 (3 p.).

Jongsomjit, Bunjerd, et al; *Co-Support Compound Formation in $Co/Al_2O_3$ Catalysts: Effect of Reduction Gas Containing CO*: Catalysis Today 77 (2002) 191-204.

Structured Catalysts and Reactors, A. Cyulski and J.A. Moulijn (eds.), Marcel Dekker Inc., 1998 (p. 599-615).

U. Balachandran et al., *Dense Ceramic Membranes for Partial Oxidation of Methane to Syngas*, Applied Catalysis A: General 133, 1995 (p. 19-29).

Jonghee Han et al., *Oxygen Permeation Through Flourite-Type-Bismuth-Yttrium-Copper Oxide Membranes*, Journal of Membrane Science, 132 (1997) p. 235-243.

H.J.M. Bouwmeester et al., *Oxygen Semipermeability of Erbia-Stabilized Bismuth Oxide*, Solid State Ionic, 53-56 (1992) p. 460-468.

Shenglin Liu et al., *Effects of Alkai and Rate Earth Metal Oxides on the Thermal Stability and the Carbon-Deposition over Nickel Based Catalyst*, Study of Surface Science and Catalyst, 119 (1998) p. 747-52.

Chung-Yi Tsai et al., *Dense Perovskite, $La_{1-x}A_xFe_{1-y}Co_yO_{3-\delta}$ (A=Ba,Sr,Ca), Membrane Synthesis, Applications and Characterization*, J. Am. Ceram. Soc. 81 [6] p. 1437-1444 (1998).

L.M. van der Haar et al., *Homogeneous Porous Perovskite Supports for Thin Dense Oxygen Separation Membranes*, Journal of Membrane Science, 180 (2000) p. 147-155.

Schulz et al., *Applied Catalyst* vol. 186 Nos. 1,2 Oct. 1999 (229 p).

Enrique Iglesia et al., "Fischer-Tropsch Synthesis on Cobalt and Ruthenium. Metal Dispersion and Support Effects on Reaction Rate and Selectivity," *Journal of Catalysts*, vol. 137, pp. 212-224 (1992).

* cited by examiner

METHOD FOR IMPROVED FISCHER-TROPSCH CATALYST STABILITY AND HIGHER STABLE SYNGAS CONVERSION

CROSS-REFERENCE TO RELATED APPLICATIONS

Not applicable.

STATEMENT REGARDING FEDERALLY SPONSORED RESEARCH OR DEVELOPMENT

Not applicable.

FIELD OF THE INVENTION

The present invention is generally related towards the field of converting hydrocarbon gas to liquid hydrocarbons. In particular, the present invention provides a new and improved method for preparing the liquid hydrocarbons from synthesis gas. More particularly, the present invention provides a method for the enhancing the stability of the Fischer-Tropsch catalyst and reaction

BACKGROUND OF THE INVENTION

Natural gas, found in deposits in the earth, is an abundant energy resource. For example, natural gas commonly serves as a fuel for heating, cooking, and power generation, among other things. The process of obtaining natural gas from an earth formation typically includes drilling a well into the formation. Wells that provide natural gas are often remote from locations with a demand for the consumption of the natural gas.

Thus, natural gas is conventionally transported large distances from the wellhead to commercial destinations in pipelines. This transportation presents technological challenges due in part to the large volume occupied by a gas. Because the volume of a gas is so much greater than the volume of a liquid containing the same number of gas molecules, the process of transporting natural gas typically includes chilling and/or pressurizing the natural gas in order to liquefy it. However, this contributes to the final cost of the natural gas.

Further, naturally occurring sources of crude oil used for liquid fuels such as gasoline and middle distillates have been decreasing and supplies are not expected to meet demand in the coming years. Middle distillates typically include heating oil, jet fuel, diesel fuel, and kerosene. Fuels that are liquid under standard atmospheric conditions have the advantage that in addition to their value, they can be transported more easily in a pipeline than natural gas, since they do not require energy, equipment, and expense required for liquefaction.

Thus, for all of the above-described reasons, there has been interest in developing technologies for converting natural gas to more readily transportable liquid fuels, i.e. to fuels that are liquid at standard temperatures and pressures. One method for converting natural gas to liquid fuels involves two sequential chemical transformations. In the first transformation, natural gas or methane, the major chemical component of natural gas, is reacted with oxygen to form syngas, which is a combination of carbon monoxide gas and hydrogen gas. In the second transformation, known as the Fischer-Tropsch process, carbon monoxide is reacted with hydrogen to form organic molecules containing carbon and hydrogen. Those organic molecules containing only carbon and hydrogen are known as hydrocarbons. In addition, other organic molecules containing oxygen in addition to carbon and hydrogen known as oxygenates may be formed during the Fischer-Tropsch process. Hydrocarbons having carbons linked in a straight chain are known as aliphatic hydrocarbons that may include paraffins and/or olefins. Paraffins are particularly desirable as the basis of synthetic diesel fuel.

Typically the Fischer-Tropsch product stream contains hydrocarbons having a range of numbers of carbon atoms, and thus having a range of molecular weights. Thus, the Fischer-Tropsch products produced by conversion of natural gas commonly contain a range of hydrocarbons including gases, liquids and waxes. Depending on the molecular weight product distribution, different Fischer-Tropsch product mixtures are ideally suited to different uses. For example, Fischer-Tropsch product mixtures containing liquids may be processed to yield gasoline, as well as heavier middle distillates. Hydrocarbon waxes may be subjected to an additional processing step for conversion to liquid and/or gaseous hydrocarbons. Thus, in the production of a Fischer-Tropsch product stream for processing to a fuel it is desirable to maximize the production of high value liquid hydrocarbons, such as hydrocarbons with at least 5 carbon atoms per hydrocarbon molecule ($C_{5+}$ hydrocarbons).

The Fischer-Tropsch synthesis is commonly facilitated by a catalyst. Catalysts desirably have the function of increasing the rate of a reaction without being consumed by the reaction. A feed containing carbon monoxide and hydrogen is typically contacted with a catalyst in a reaction zone that may include one or more reactors.

The composition of a catalyst influences the relative amounts of hydrocarbons obtained from a Fischer-Tropsch catalytic process. Common catalysts for use in the Fischer-Tropsch process contain at least one metal from Groups 8, 9, or 10 of the Periodic Table (in the new IUPAC notation, which is used throughout the present specification).

Cobalt metal is particularly desirable in catalysts used in converting natural gas to heavy hydrocarbons suitable for the production of diesel fuel. Alternatively, iron, nickel, and ruthenium have been used in Fischer-Tropsch catalysts. Nickel catalysts favor termination and are useful for aiding the selective production of methane from syngas. Iron has the advantage of being readily available and relatively inexpensive but the disadvantage of a high water-gas shift activity. Ruthenium has the advantage of high activity but is quite expensive.

Catalysts often further employ a promoter in conjunction with the principal catalytic metal. A promoter typically improves one or more measures of the performance of a catalyst, such as activity, stability, selectivity, reducibility, or regenerability.

Further, in addition to the catalytic metal, a Fischer-Tropsch catalyst often includes a support material. The support is typically a porous material that provides mechanical strength and a high surface area in which the catalytic metal and any promoter(s) may be deposited. Catalyst supports for catalysts used in Fischer-Tropsch synthesis of hydrocarbons have typically been refractory oxides (e.g., silica, alumina, titania, zirconia or mixtures thereof).

After a period of time in operation, a catalyst will become deactivated, losing its effectiveness for catalyzing the desired reaction to a degree that makes the process uneconomical at best and inoperative at worst. The more deactivated a particular catalyst is, the less efficient the catalyst is at enhancing the rate of the desired reaction. At this point, the catalyst must either be replaced or regenerated, both of which are expensive and time consuming.

Catalyst systems can become deactivated by any number of mechanisms. For example, water oxidation is a serious problem due to the fact that water is a major by-product of the Fischer-Tropsch reaction. Further, the higher the partial pressure of water, the higher the deactivation rate. This problem can be further exacerbated by the presence of small crystallites of the catalytically active metal. Fischer-Tropsch catalysts are typically composed of small and large crystallites. It is known that the small crystallites are highly active under typical Fischer-Tropsch operating conditions. However, large crystallites are more stable and resistant to water oxidation under typical Fischer-Tropsch operating conditions than the smaller crystallites.

In order to take advantage of the different characteristics between large and small crystallites, catalyst preparations and methods have focused on trying to control the crystallite sizes in the catalyst material. However, controlling the crystal size is expensive and very difficult. In addition, other methods known in the art have focused on periodic regeneration of the catalyst material. However, this approach adds considerable complexity to the overall process and also increases costs. Further, once the catalyst is re-introduced it will still face the same problems.

Hence, there is a great need to identify new catalyst preparation methods that create more stable catalyst compositions that have and maintain high activity or syngas conversion values and/or new Fischer-Tropsch operating methods that result in a more stable Fischer-Tropsch reaction. In addition, methods that can prepare Fischer-Tropsch catalysts that resist at least one of the deactivation phenomena in a simple, cost effective and practical manner.

SUMMARY OF THE INVENTION

The present invention is generally directed towards an improvement in the stability of synthesis catalysts and their reactions. In particular, the present invention provides a new and improved method for synthesis catalysts that exhibit less deactivation while maintaining a high activity level.

In general, the preferred embodiment comprises subjecting the catalyst material to a low (ppm) level of molecular oxygen to convert smaller metal crystallites in a catalyst matrix to an inactive metal oxide state. It is believed that the small crystallites are more susceptible to oxidation by water and therefore have a greater detriment to the catalyst stability. The inactivation of the smaller, more active and unstable crystallites enhances the overall catalyst stability resulting in a more stable syngas conversion over a sustained period of time. In addition smaller crystallites produce more methane during the synthesis reaction. This inactivation of the smaller crystallites decreases the selectivity of the catalyst towards methane formation.

In one embodiment of the present invention, the catalyst is subjected to ppm levels of oxygen during catalyst activation. The oxygen prevents the small metal oxide crystallites from being converted to active metal. Alternatively, ppm levels of oxygen can be co-fed into the Fischer-Tropsch reactor during the Fischer-Tropsch reaction. In this embodiment, the oxygen will rapidly convert the smaller metal crystallites to inactive metal oxide. In yet another embodiment, the catalyst may be subjected to low levels of oxygen both during the activation of catalyst material and during the reaction.

These and other embodiments, features and advantages of the present invention will become apparent with reference to the following detailed description and drawings.

BRIEF DESCRIPTION OF THE DRAWINGS

For a more detailed understanding of the present invention, reference is made to the accompanying Figures, wherein.

DETAILED DESCRIPTION OF THE PREFERRED EMBODIMENTS

Figure 1:
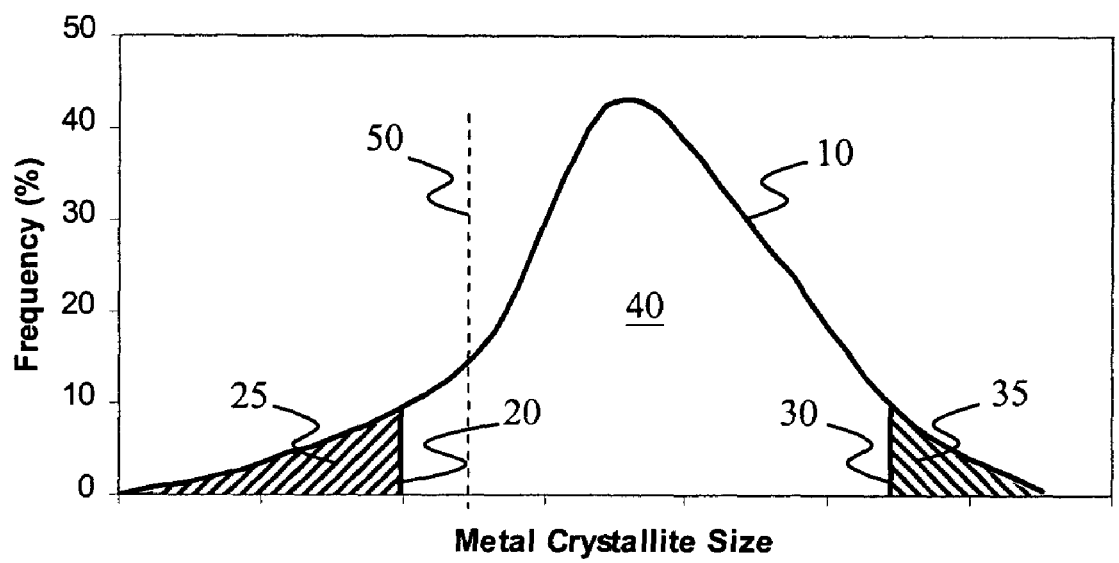
FIG. 1 shows a qualitative catalytic metal crystallite distribution for a typical Fischer-Tropsch catalyst composition.

There are shown in the Figures, and herein will be described in detail, specific embodiments of the present invention with the understanding that the present disclosure is to be considered an exemplification of the principles of the invention, and is not intended to limit the invention to that illustrated and described herein. The present invention is susceptible to embodiments of different forms or order and should not be interpreted to be limited to the particular methods or compositions contained herein. In particular, various embodiments of the present invention provide a number of different configurations of the overall gas to liquid conversion process.

The present invention is directed toward improving the stability and selectivity of Fischer-Tropsch catalysts and consequently enhancement of the Fischer-Tropsch reaction. In general, the preferred embodiments comprises subjecting the catalyst material to a small (ppm) level of oxygen, such that the smaller metal crystallites in the catalyst matrix are present in an inactive metal oxide state. The inactivation of these small crystallites can be done as part of the preparation process or as the reaction proceeds. In one embodiment of the present invention, the catalyst is subjected to ppm levels of oxygen during catalyst activation prior to use in a synthesis reactor. It should be appreciated that "prior to use" is not intended to mean a fresh catalyst that has never been exposed to reaction conditions, but can include catalysts that have previously been used and have been regenerated, rejuvenated, recovered or reconditioned. The oxygen prevents the small metal oxide crystallites from being converted to active metal. Alternatively, ppm levels of oxygen can be co-fed into the Fischer-Tropsch reactor during the Fischer-Tropsch reaction. In this embodiment, the oxygen will rapidly convert the smaller metal crystallites to inactive metal oxide. In yet another embodiment, the catalyst may be subjected to low levels of oxygen both during the activation of catalyst material and during the reaction.

Although Fischer-Tropsch catalysts and reactions are expressly mentioned, the present invention is equally applicable to other types of metal catalysts and reactions. Fischer- Tropsch catalysts and reactions are expressly mentioned herein only as a preferred embodiment and for the sake of clarity and illustration. One skilled in the art will readily understand the applicability of the present invention towards other synthesis catalysts and reaction systems. Thus, this specificity should not be interpreted as limiting but instead the present invention should be limited only by the claims as provided.

Nonetheless, in a preferred embodiment, the synthesis reactor will comprise a Fischer-Tropsch reactor. Any Fischer-Tropsch technology and/or methods known in the art will suffice, however, a multiphase slurry bubble reactor is preferred. The feed gases charged to the process of the invention comprise hydrogen, or a hydrogen source, and carbon monoxide. $H_2/CO$ mixtures suitable as a feedstock for conversion to hydrocarbons according to the process of this invention can be obtained from light hydrocarbons, such as methane or hydrocarbons comprised in natural gas, by means of steam reforming, auto-thermal reforming, dry reforming, advanced gas heated reforming, partial oxidation, catalytic partial oxidation, or other processes known in the art. Alternatively, the $H_2/CO$ mixtures can be obtained from biomass and/or from coal by gasification. In addition the feed gases can comprise off-gas recycle from the present or another Fischer-Tropsch process. Preferably the hydrogen is provided by free hydrogen, although some Fischer-Tropsch catalysts have sufficient water gas shift activity to convert some water and carbon monoxide to hydrogen and carbon dioxide for use in the Fischer-Tropsch process. It is preferred that the molar ratio of hydrogen to carbon monoxide in the feed be greater than 0.5:1 (e.g., from about 0.67 to 2.5). Preferably, when cobalt, nickel, and/or ruthenium catalysts are used, the feed gas stream contains hydrogen and carbon monoxide in a molar ratio of about 1.4 to 2.3:1, more preferably in a molar ratio of about 1.6 to 2.3:1. Preferably, when iron catalysts are used the feed gas stream contains hydrogen and carbon monoxide in a molar ratio between about 1.4:1 and 2.2:1. The feed gas may also contain carbon dioxide. The feed gas stream should contain only a low concentration of compounds or elements that have a deleterious effect on the catalyst, such as poisons. For example, the feed gas may need to be pretreated to ensure that it contains low concentrations of sulfur or nitrogen compounds such as hydrogen sulfide, hydrogen cyanide, ammonia and carbonyl sulfides.

The feed gas is contacted with the catalyst in a reaction zone. Mechanical arrangements of conventional design may be employed as the reaction zone including, for example, fixed bed, fluidized bed, slurry bubble column or ebulliating bed reactors, among others. Accordingly, the preferred size and physical form of the catalyst particles may vary depending on the reactor in which they are to be used.

The Fischer-Tropsch process is typically run in a continuous mode. In this mode, the gas hourly space velocity through the reaction zone typically may range from about 50 to about 10,000 $hr^{-1}$, preferably from about 300 $hr^{-1}$ to about 2,000 $hr^{-1}$. The gas hourly space velocity is defined as the volume of reactants per time per reaction zone volume. The volume of reactant gases is at standard pressure (101 kPa) and standard temperature (0° C.). The reaction zone volume is defined by the portion of the reaction vessel volume where reaction takes place and which is occupied by a gaseous phase comprising reactants, products and/or inerts; a liquid phase comprising liquid/wax products and/or other liquids; and a solid phase comprising catalyst. The reaction zone temperature is typically in the range from about 160° C. to about 300° C. Preferably, the reaction zone is operated at conversion promoting conditions at temperatures from about 190° C. to about 260° C. The reaction zone pressure is typically in the range of about 80 psia (552 kPa) to about 1000 psia (6895 kPa), more preferably from 80 psia (552 kPa) to about 800 psia (5515 kPa), and still more preferably, from about 140 psia (965 kPa) to about 750 psia (5170 kPa). Most preferably, the reaction zone pressure is in the range from about 140 psia (965 kPa) to about 550 psia (3447 kPa).

When the Fischer-Tropsch reactor comprises a slurry bubble column reactor, the syngas feedstock bubbles up through the slurry column. The gas generally serves to maintain some level of mixing as it moves up the column. As the gas moves upward, it comes in contact with the catalyst material and the hydrocarbon synthesis reaction takes place. Products are formed including hydrocarbons and water. Water is a by-product of the Fischer-Tropsch reaction as shown in equation (1).

$$CO+2H_2 \leftrightarrow -(CH_2)-+H_2O \qquad (1)$$

Fischer-Tropsch catalysts are well known in the art and generally comprise a catalytically active metal, a promoter and optionally a support structure. The most common catalytic metals are Group 8, 9 and 10 metals of the Periodic Table (new Notation as found in, for example, the CRC Handbook of Chemistry and Physics, $82^{nd}$ Edition, 2001–2002), such as cobalt, nickel, ruthenium, and iron or mixtures thereof. The preferred metals used in Fischer-Tropsch catalysts with respect to the present invention are cobalt, iron and/or ruthenium, however, this invention is not limited to these metals or the Fischer-Tropsch reaction. Other suitable catalytic metals include group 8, 9 and 10 metals. The promoters and support material are not critical to the present invention and may be comprised, if at all, by any composition known and used in the art. Promoters suitable for Fischer-Tropsch synthesis may comprise at least one metal from Group 1, 7, 8, 9, 10, 11, and 13, preferably ruthenium (Ru), platinum (Pt), palladium (Pd), rhenium (Re), boron (B), lithium (Li), copper (Cu), potassium (K), silver (Ag), and sodium (Na), more preferably ruthenium (Ru), platinum (Pt), palladium (Pd), rhenium (Re), boron (B), and silver (Ag) with the catalytic metal as cobalt, and more preferably lithium (Li), copper (Cu), potassium (K), silver (Ag), and sodium (Na) with the catalytic metal as iron. The preferred support compositions when used comprise alumina, silica, titania, zirconia or mixtures thereof. More preferably, the support comprises modified or stabilized alumina, or silica-alumina.

Most methods of preparation for these Fischer-Tropsch catalysts are similar throughout the art, in that, the preparation processes include a reduction step to the active state of the catalytic metal. Absent a deliberate attempt to do otherwise, e.g., geometric tailoring, these preparation techniques result in a full range of sizes for the catalytically active metal crystallites present in a typical Fischer-Tropsch catalyst composition.

Referring to FIG. 1, although all sizes of metal crystallites are present, the very small and very large crystallites generally make up a non-negligible volume of the total catalyst composition. For example, the smaller crystallites are represented by the region under curve 10 to the left of line 20 designated as area 25. The larger crystallites are represented by the region under curve 10 to the right of line 30 designated as area 35. The bulk of the metal crystallites fall under the curve between lines 20 and 30 in area 40. As stated previously, the smaller crystallites 25 are very active due to their high ratio of exposed metal atoms versus bulk metal atoms, i.e., have a high CO conversion value, but are less stable relative to the larger crystallites found in area 35 and 40. According to the present invention, it is intended that reference to small or smaller crystallites, generally indicated as represented by area 25, have a size of equal to or less than about 5 nm.

Figure 2:
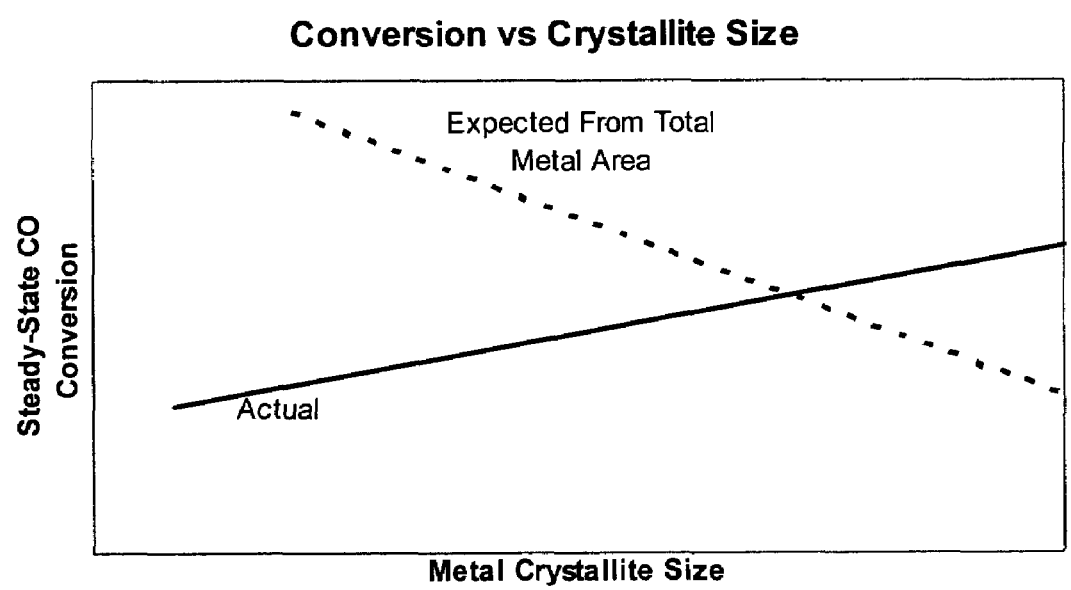
FIG. 2 shows a qualitative plot of steady state CO conversion versus catalytic metal crystallite size for a typical Fischer-Tropsch catalyst composition.

Contrary to the current belief that the rate of reaction increases with the active metal dispersion or number of metal sites available on the structure of the catalyst, as described in Iglesia E., Soled S. L. & Fiato R. A., Journal of Catalysis, Volume 137, pp. 212–224 (1992), it has been discovered that, after about 120 hours on line, a higher metal dispersion does not necessarily result in a stable conversion. Referring to FIG. 2, the steady state or stable carbon monoxide (CO) conversion exhibited by a catalyst is a function of the average crystallite size of the metal. However, the Applicants observed that the steady state CO conversion with cobalt-based Fischer-Tropsch catalysts is actually increasing as the metal dispersion decreases (or as the metal crystallite size increases); thus, the actual trend of steady-state conversion versus dispersion is opposite than what would be expected from the prior art.

It is believed that the discrepancy is because of the faster deactivation of metal crystallite having a size below about 5 nm. A high metal dispersion on the catalyst results in a reduced average metal crystallite size, such that the catalyst contains more metal crystallites below about 5 nm in size. The presence of the small activated crystallites at the initial stages of a Fischer-Tropsch reaction results in a high concentration of water due to their higher activity. This initial high water concentration not only tends to deactivate the smaller metal crystallites but also in this process quickly begins to deactivate the larger crystallites surrounding the smaller crystallites. The result is a decrease in activity and water production over time due to the deactivation of metal crystallites. As the high water producing (smaller) crystallites are deactivated, the water concentration decreases and a nearly steady state activity (CO conversion) level is achieved with the remaining larger crystallites that produce less water and are more resistant to deactivation. The value of the steady state activity (CO conversion) decreases as the average crystallite size decreases as shown in FIG. 2. Hence, the presence of greater amounts of small metal crystallites decreases the catalyst activity exhibited over a sustained period of time. For commercial applications, the initial activity is not as important (especially during the first 3 to 4 days on line) as the catalyst life is expected to be at least 6 months. So a stable steady-state conversion is much more critical to the economical use of the catalysts. Although one would expect from prior art that a high metal dispersion is preferred because of the initial high catalytic activity, it is believed that for the long term use of these catalysts, a lower dispersion with larger active metal crystallite sizes will contribute to a more stable steady-state CO conversion. Because the smaller crystallites (i.e., below 5 nm in size) deactivate (mostly by water oxidation) faster than the larger ones, and because there is an expected long-term stable conversion in the absence of smaller crystallites, the smaller crystallites should preferably be deactivated and/or not allowed to participate to the catalytic reaction by keeping them in an oxide form.

Figure 3:
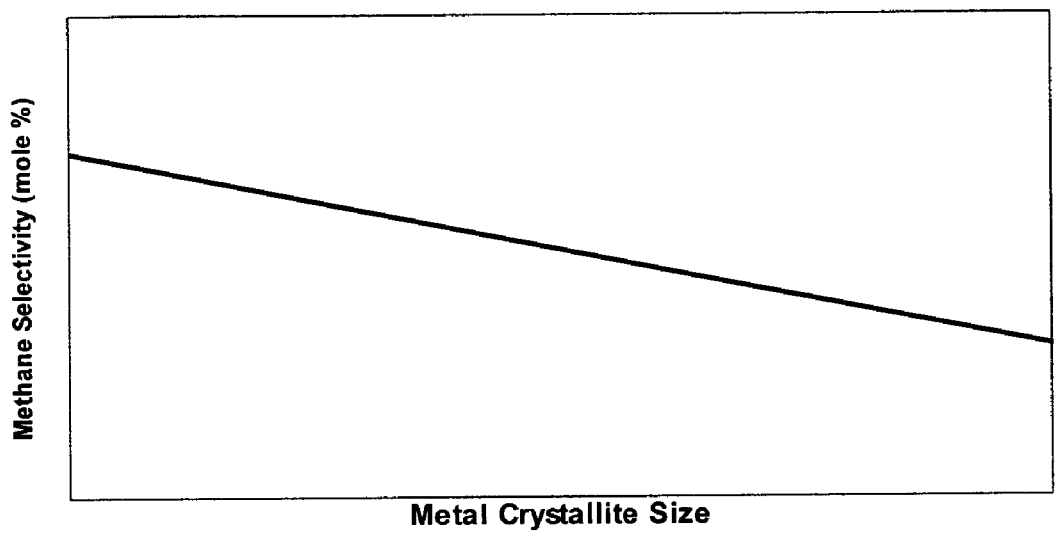
FIG. 3 shows a qualitative plot of methane selectivity versus catalytic metal crystallite size for a typical Fischer-Tropsch catalyst composition.

Referring to FIG. 3, the selectivity towards methane formation exhibited by a catalyst is a function of the average crystallite size of the metal. As the average metal crystallite size decreases, the selectivity of the catalyst towards methane formation increases. The formation of methane during the synthesis reaction is undesirable as its monetary value is much smaller than the higher molecular weight hydrocarbons co-produced in the synthesis reaction. Although the effect appears relatively small, it is expected that for a 80,000-barrels-per-day Gas-to-Liquid plant, a 1% difference in methane selectivity (by weight) is equivalent to a loss/gain of about 30 millions of dollars per year.

According to the present invention, the detrimental effects of the smaller metal crystallites (labeled as 25 in FIG. 1) are reduced or eliminated by inactivating them prior to or rapidly during the synthesis reaction. The inactivation of the smaller crystallites is carried out in accordance with the present invention by subjecting the metal crystallites to low levels of oxygen. The molecular oxygen ($O_2$) preferentially oxidizes the smaller catalytically active metal crystallites to inactivate metal oxide. In this manner the effect of molecular oxygen is similar to that of water in preferentially inactivating smaller metal crystallites. Both molecular oxygen and water are good oxidants. However, molecular oxygen has an advantage over water, as the $O_2$ level is easier to control because molecular oxygen, unlike water, is not a product of the synthesis reaction. It is preferred that the receiving catalyst experience greater than 0.1 ppm oxygen, preferably between about 0.1 to 20 ppm oxygen, preferably between about 0.1 to 10 ppm oxygen, in a stream with 50 $hr^{-1}$ to 10,000 $hr^{-1}$ of GHSV. The oxygen can be introduced as a mixture with a carrier gas, preferably inert under Fischer-Tropsch reaction conditions, including but not limited to nitrogen, argon, light hydrocarbons, syngas, hydrogen, carbon monoxide, any reducing gas, or mixtures thereof. Thus, the oxygen can be introduced either as part of the activation or reduction of the metal crystallites, during the actual operation of the Fischer-Tropsch reactor or in any stages in between. Temperature and pressure during the process can conform to the operating conditions most useful to the environment in which it is conducted. The low level of molecular oxygen inactivates the smaller metal crystallites and increases the catalyst stability and selectivity towards higher molecular weight hydrocarbon products rather than methane.

The drop in conversion typically observed in the first 3–4 days on line causes process instability and this rapid drop is hard to compensate. The initial high conversion, which is typically 20% or more than the pseudo-steady state conversion, may result in bottlenecks downstream of the reactor. It might be necessary to start the reactor by keeping the conversion intentionally at a value similar to the expected steady-state value, hence is maintaining the conversion at start-up lower than the expected initial conversion should be. Keeping the reactor conversion low at start-up can be achieved by for example lowering the reaction temperature. However lowering the reaction temperature will also create other problems such as a high degree of deactivation due to surface condensation mechanism. Another option to reduce intentionally the reactor conversion at start-up is to lower the hydrogen to carbon monoxide ratio ($H_2/CO$) in the reactor feed in order to lower the reactor conversion; but this would also create some bottlenecks upstream of the reactor. This invention relates to the use of small amounts of $O_2$ to the reactor in order to prevent a large fluctuation in conversion during the start-up phase of reactor operation while keeping reactor pressure, temperature and inlet $H_2/CO$ ratio relatively the same throughout start-up and continuous operation.

Synthesis gas typically has no or minimal level of molecular oxygen. One method according to this invention would comprise the following steps: providing a feedstream comprising synthesis gas; measuring the oxygen concentration of the feedstream; providing a source of a molecular oxygen-containing gas; and adding a portion of said molecular oxygen-containing gas to adjust the oxygen concentration to a desirable value by enriching the feedstream in oxygen. Since synthesis gas can be produced by various processes, it is envisioned that there might be some oxygen present in the synthesis gas, particularly when produced by the oxidative syngas processes (such as auto-thermal reforming, partial combustion, and catalytic partial oxidation). Therefore one alternate method according to this invention would comprise the following steps: providing a feedstream comprising synthesis gas; measuring the oxygen concentration of the FT feedstream comprising synthesis gas; providing a gas comprising no molecular oxygen; and adding a portion of said gas to adjust the oxygen concentration to a desirable value by diluting the oxygen content of the feedstream. Yet another alternate method according to this invention would comprise the following steps: providing a feedstream comprising synthesis gas; measuring the oxygen concentration of the FT feedstream comprising synthesis gas; removing a portion of oxygen from at least a portion of the FT feedstream by passing said portion of the FT feedstream through an oxygen removal unit, such that the oxygen concentration in the FT feedstream entering the FT reactor is adjusted to a desirable value.

The present invention will be more easily and fully understood by the following examples. The examples are representative of the processes in accordance with certain embodiments of the preferred present invention.

EXAMPLES

Catalyst Preparation:

An alumina support was impregnated with a solution containing a cobalt salt (nitrate) and catalytic promoters precursors via multiple incipient wetness impregnation steps. The impregnated support was dried at a drying temperature of about 80° C. to generate dried solids. The solids were then heated at 0.5° C. per minute to a calcination temperature, about 350° C., and maintaining the solids at this temperature for about 30 minutes. The solids were then reduced in hydrogen flow at 0.5° C. per minute to 400° C. for 16 hours in a fluidized bed at near atmospheric pressure. The material was cooled, flushed with nitrogen and then sealed for transport into an inert atmosphere glove box. Before transfer to the reactor, 2 grams of the catalyst were mixed with about 180 grams of degassed solvent inside the glove box. The solvent used for the tests was a base oil used for lubricants manufacture and was substantially free of sulfur and nitrogen compounds. The solvent was degassed with nitrogen to remove dissolved oxygen.

Fischer-Tropsch Performance Testing:

The reduced Fischer-Tropsch catalyst was tested in a laboratory continuous-flow stirred tank reactor comprising a 600-mL pressure vessel. The catalyst/solvent mixture was transferred to the reactor and purged with nitrogen for 1 hour. The purging step further ensured the absence of oxygen in the reactor and/or on the catalyst.

Figure 4:
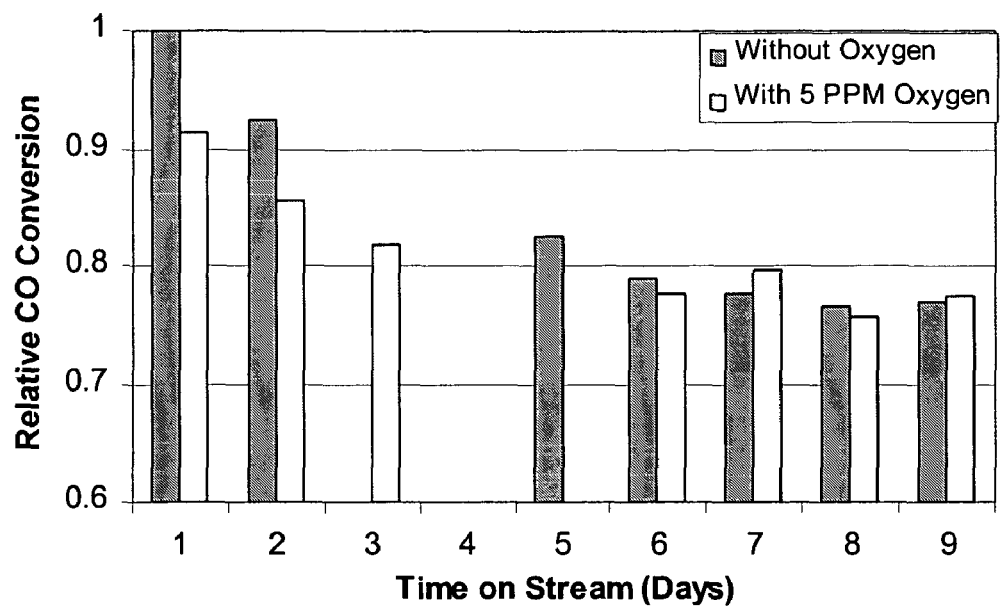
FIG. 4 shows a plot of relative conversion versus time on stream for the Fischer-Tropsch synthesis with and without ppm levels of molecular oxygen in the syngas feed.

The reaction tests-were run at 228° C., 350 psig (2515 kPa), a space velocity of 7.8 normal liters per hour per gram of catalyst, a molar hydrogen to carbon monoxide ratio of about 2.0 and with about 10 mole percent of nitrogen in the synthesis gas feed. Two experiments were run: one with 5 ppm of melecular oxygen in the synthesis gas feed, and the other without any molecular oxygen. The carbon monoxide conversion (in mole %) was measured at several reaction times on stream (TOS). The relative CO conversions obtained for the two runs are shown in FIG. 4 and Table 1 below. The relative CO conversion is defined as the CO conversion at a given time on stream divided by the initial CO conversion for the run without oxygen in the syngas feed.

TABLE 1

| Time on Stream | Relative CO Conversion | |
|---|---|---|
| Days | Without Oxygen | With 5 PPM Oxygen |
| 1 | 1.00 | 0.91 |
| 2 | 0.92 | 0.86 |
| 3 | | 0.82 |
| 5 | 0.82 | |
| 6 | 0.79 | 0.78 |
| 7 | 0.78 | 0.80 |
| 8 | 0.77 | 0.76 |
| 9 | 0.77 | 0.78 |

Figure 5:
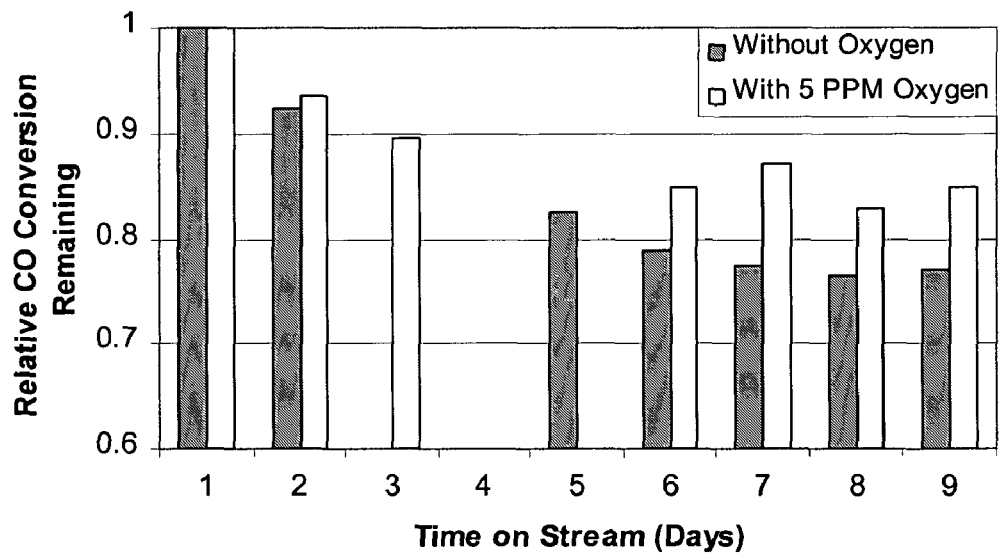
FIG. 5 shows a plot of relative conversion versus time on stream for the Fischer-Tropsch synthesis with and without ppm levels of molecular oxygen in the syngas feed.

A measure of catalyst stability is the ratio of the final CO conversion to the initial CO conversion exhibited by the catalyst, which represents how much portion of the CO conversion remains at a given time on stream compared to the initial CO conversion. The higher this ratio the more stable the catalyst. For the experiment with oxygen addition, this ratio is 0.86 after 9 days on line. For the experiment without oxygen addition the ratio is 0.77 after the same amount of time on line (see FIG. 5).

The above-described process naturally provides an improved process for Fischer-Tropsch catalyst preparation, Fischer-Tropsch production and ultimately an improved method for the conversion of hydrocarbon gas to liquids. Both benefits are based on the fact that the present invention provides a means for obtaining a longer catalyst lifetime as well as a more practical means for preparing synthesis catalysts the achieve and maintain an overall CO conversion close to the pseudo-steady state value during start-up of the FT reactor without changing reaction conditions. One main advantage of this invention is the prevention of a large difference between initial conversion (whether the catalyst is fresh and/or regenerated) and the pseudo-steady state conversion (which corresponds to a region of low catalyst deactivaton rate), which ultimately facilitates the operation and start-up on the FT reactor. The conversion of hydrocarbon gas to liquids in accordance with the present invention involves first the preparation of the synthesis gas feedstocks followed by the hydrocarbon synthesis reaction using the catalysts prepared or the process described in accordance with the present invention. The catalyst preparation methods as well as the hydrocarbon synthesis, preferably a Fischer-Tropsch reaction, are already described above. The preparation of the Fischer-Tropsch feedstock, i.e., syngas, is described below.

According to the present invention, a syngas reactor can comprise any of the synthesis gas technology and/or methods known in the art. $H_2$/CO mixtures suitable as a feedstock for conversion to hydrocarbons according to the process of this invention can be obtained from light hydrocarbons, such as methane or hydrocarbons comprised in natural gas, by means of steam reforming, auto-thermal reforming, dry reforming, advanced gas heated reforming, partial oxidation, catalytic partial oxidation, or other processes as are known by one skilled in the art. Other suitable hydrocarbon feedstocks for synthesis gas production are also readily available from a variety of other sources such as biomass, higher chain hydrocarbon liquids, coal, coke, hydrocarbon gases, etc., all of which are clearly known in the art. Preferably, the hydrocarbon-containing feed is almost exclusively obtained as natural gas. However, the most important component is generally methane. Similarly, the oxygen-containing gas may come from a variety of sources and will be somewhat dependent upon the nature of the reaction being used. For example, a partial oxidation reaction requires diatomic oxygen as a feedstock while steam reforming requires only steam. According to the preferred embodiment of the present invention, partial oxidation is assumed for at least part of the syngas production reaction.

Regardless of the sources, the hydrocarbon-containing feed and the oxygen-containing feed are reacted under catalytic conditions. The catalyst compositions useful for the production of synthesis gas are well known in the art. They generally are comprised of a catalytic metal. The most common catalytic metals are elements for Groups 8, 9, and 10 of the Periodic Table. The support structures may be monoliths, wire mesh and particulates. Often, the support selected will dictate the type of catalyst bed that must be used. For example, fixed beds are comprised of monoliths and large particle sized supports. Supports comprised of small particles tend to be more useful in fluidized beds. The support matrix is usually a metal oxide or mixture of metal oxides, such as alumina, titania, zirconia or the like.

The synthesis gas feedstocks are generally preheated, mixed and passed over or through the catalyst beds. As the mixed feedstocks contact the catalyst the synthesis reactions take place. The synthesis gas product contains primarily hydrogen and carbon monoxide, however, many other minor components may be present including steam, nitrogen, carbon dioxide, ammonia, hydrogen cyanide, etc., as well as unreacted feedstock, such as methane, other light hydrocarbons, and/or oxygen. The synthesis gas product, i.e., syngas, is then ready to be used, treated, or directed to its intended purpose. For example, in the instant case some or all of the syngas will be used as a feedstock for the Fischer-Tropsch process.

While preferred embodiments of this invention have been shown and described, modification thereof can be made by one skilled in the art without departing from the spirit or teaching of this invention. The embodiments described herein are exemplary only and are not limiting. Many variations and modifications of the processes are possible and are within the scope of this invention. Accordingly, the scope of protection is not limited to the embodiments described herein, but is only limited by the claims that follow, the scope of which shall include all equivalents of the subject matter of the claims. In addition, unless order is explicitly recited, the recitation of steps in a claim is not intended to require that the steps be performed in any particular order, or that any step must be completed before the beginning of another step.

What is claimed is:

1. A process for producing liquid hydrocarbons comprising:
   (a) contacting a hydrocarbon synthesis catalyst comprising a plurality of molecular metal crystallites having a plurality of crystallite sizes with a gas comprising an oxygen content of between 0.1 and 20 ppm; and
   (b) reacting a gas feedstream comprising hydrogen and carbon monoxide in a hydrocarbon synthesis reactor containing the hydrocarbon synthesis catalyst under conditions effective to produce hydrocarbon products wherein at least a portion of the hydrocarbon products are liquid under the operating conditions of the synthesis reactor.

2. The process of claim 1 wherein the oxygen content is between 0.1 and 10 ppm.

3. The process of claim 1 wherein step (a) is carried out during any activation process for the synthesis catalyst.

4. The process of claim 1 wherein step (a) is carried out during operation of the hydrocarbon synthesis reactor.

5. The process of claim 1 wherein step (a) and step (b) are carried out simultaneously.

6. The process of claim 1 wherein step (a) and step (b) are carried out intermittently within the synthesis reactor.

7. The process of claim 5 wherein the hydrocarbon synthesis catalyst comprises a Fischer-Tropsch catalyst.

8. The process of claim 1 wherein the synthesis catalyst exhibits an initial CO conversion and a pseudo-steady state CO conversion, and the ratio of the pseudo-steady state CO conversion over the initial CO conversion is equal to or greater than 0.8.

9. A process for producing hydrocarbons from synthesis gas comprising:
   (a) providing an initial feedstream comprising hydrogen and carbon monoxide;
   (b) optionally, determining an oxygen content of said feedstream;
   (c) adding an amount of a gas stream to said feedstream to provide an adjusted feedstream having a more desirable oxygen content of between 0.1 and 20 ppm; and
   (d) reacting at least a portion of said adjusted feedstream stream comprising a more desirable oxygen content over a hydrocarbon synthesis catalyst comprising a plurality of catalytic metal crystallites of different sizes.

10. The process of claim 9 wherein the adjusted feedstream has an oxygen content between 0.1 and 10 ppm.

11. The process of claim 9 wherein the initial feedstream has an oxygen content more than 20 ppm, and step (c) comprises adding the gas stream having no molecular oxygen, thereby diluting the initial feedstream.

12. The process of claim 9 wherein the initial feedstream has an oxygen content less than 20 ppm, and step (c) comprises adding the gas stream having molecular oxygen, thereby enriching the initial feedstream.

13. The process of claim 9 wherein the more desirable oxygen content in said adjusted feedstream is sufficient for inactivating substantially all of the crystallites having a size below 5 nm.

14. The process of claim 9 wherein the hydrocarbon synthesis catalyst is active for Fischer-Tropsch synthesis.

15. The process of claim 9 wherein the hydrocarbon synthesis catalyst comprises cobalt, iron, or ruthenium.

16. A process for producing hydrocarbons from synthesis gas comprising:
   (a) providing an initial feedstream comprising oxygen, hydrogen and carbon monoxide;
   (b) optionally, determining an oxygen content of said feedstream;
   (c) generating an adjusted feedstream by removing a portion of said oxygen from at least a portion of the initial Fischer-Tropsch feedstream by passing said portion of the initial feedstream through an oxygen removal unit, such that the oxygen concentration in the adjusted feedstream is adjusted to a more desirable value of between 0.1 and 20 ppm and
   (d) reacting under conditions effective to produce hydrocarbons at least a portion of said adjusted feedstream comprising the more desirable oxygen content over a hydrocarbon synthesis catalyst comprising a plurality of catalytic metal crystallites of different sizes.

17. The process of claim 16 wherein the adjusted feedstream has an oxygen content between 0.1 and 10 ppm.

18. The process of claim 16 wherein the initial feedstream has an oxygen content more than 20 ppm, and step (c) comprises removing enough oxygen to achieve an oxygen content between 0.1 and 20 ppm in the adjusted feedstream.

19. The process of claim 16 wherein the more desirable oxygen content in said adjusted feedstream is sufficient for inactivating substantially all of the crystallites having a size below 5 nm.

20. The process of claim 16 wherein the hydrocarbon synthesis catalyst is active for Fischer-Tropsch synthesis.

21. The process of claim 16 wherein the hydrocarbon synthesis catalyst comprises cobalt, iron, or ruthenium.

22. The process of claim 1 wherein the hydrocarbon synthesis catalyst comprises cobalt, iron, or ruthenium.

23. A process for producing hydrocarbons from synthesis gas comprising:
providing a hydrocarbon synthesis catalyst comprising a plurality of metal crystallites having a plurality of crystallites sizes, wherein the hydrocarbon synthesis catalyst is activated with a reducing gas and subjected to low levels of oxygen of between 0.1 and 20 ppm; and
reacting a feedstream comprising hydrogen and carbon monoxide in a hydrocarbon synthesis reactor containing said hydrocarbon synthesis catalyst under conditions effective to produce hydrocarbon products, wherein at least a portion of the hydrocarbon products are liquid under the operating conditions of the synthesis reactor.

24. The process of claim 23 wherein the hydrocarbon synthesis catalyst is subjected to low levels of oxygen during the catalyst activation with the reducing gas.

25. The process of claim 24 wherein the reducing gas comprises said low levels of oxygen.

26. The process of claim 25 wherein the reducing gas has an oxygen content between 0.1 and 10 ppm.

27. The process of claim 23 wherein the catalyst exhibits an initial CO conversion and a pseudo-steady state CO conversion, and the ratio of the pseudo-steady state CO conversion over the initial CO conversion is equal to or greater than 0.8.

28. The process of claim 23 wherein the hydrocarbon synthesis catalyst comprises cobalt, iron, ruthenium.

29. The process of claim 23 wherein the hydrocarbon synthesis catalyst comprises cobalt as catalytic metal and wherein subjecting the catalyst to low oxygen levels is carried out in a manner sufficient to inactivate substantially all of the catalytic metal crystallites having a size below 5 nm.

* * * * *